US010412185B2

(12) United States Patent
Lu

(10) Patent No.: US 10,412,185 B2
(45) Date of Patent: Sep. 10, 2019

(54) EVENT INFORMATION SYSTEM CLASSIFYING MESSAGES USING MACHINE LEARNING CLASSIFICATION MODEL AND PUSHING SELECTED MESSAGES TO USER

(71) Applicant: Tencent Technology (Shenzhen) Company Limited, Shenzhen (CN)

(72) Inventor: Zheng Lu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 78 days.

(21) Appl. No.: 15/699,678

(22) Filed: Sep. 8, 2017

(65) Prior Publication Data

US 2018/0013846 A1 Jan. 11, 2018

Related U.S. Application Data

(63) Continuation-in-part of application No. PCT/CN2016/082212, filed on May 16, 2016.

(30) Foreign Application Priority Data

Sep. 29, 2015 (CN) .......................... 2015 1 0632370

(51) Int. Cl.
*H04L 29/08* (2006.01)
*G06F 16/28* (2019.01)
(Continued)

(52) U.S. Cl.
CPC ............ *H04L 67/26* (2013.01); *G06F 16/285* (2019.01); *G06Q 50/01* (2013.01); *H04L 51/16* (2013.01); *H04L 51/32* (2013.01); *H04L 67/22* (2013.01)

(58) Field of Classification Search
CPC ........ G06F 17/30241; G06F 17/30569; G06F 17/3089; G06F 21/6218; G06F 16/285;
(Continued)

(56) References Cited

U.S. PATENT DOCUMENTS 9,256,761 B1 * 2/2016 Sahu .................... G06F 21/6218
2009/0150489 A1 * 6/2009 Davis ................... G06Q 10/107
709/204
(Continued)

FOREIGN PATENT DOCUMENTS

CN 102469032 A 5/2012
CN 102609465 A 7/2012
(Continued)

OTHER PUBLICATIONS

Tencent Technology, ISRWO, PCT/CN2016/082212, Jul. 27, 2016, 8 pgs.
(Continued)

*Primary Examiner* — Le H Luu
(74) *Attorney, Agent, or Firm* — Morgan, Lewis & Bockius LLP

(57) ABSTRACT

The present disclosure provides an event information push method performed at a computer system, the method including: collecting network messages from a social networking platform; performing aggregation on the network messages, to obtain corresponding event information; obtaining, for each piece of event information, one or more attributes from the corresponding category of network messages; obtaining, from an event information and user database, a user group corresponding to the one or more attributes of each piece of event information; and pushing each piece of event information to a user in the user group corresponding to the event information.

20 Claims, 6 Drawing Sheets

(51) Int. Cl.
*H04L 12/58* (2006.01)
*G06Q 50/00* (2012.01)

(58) Field of Classification Search
CPC .. G06Q 10/02; G06Q 10/107; G06Q 30/0242; G06Q 50/01; H04L 51/02; H04L 51/20; H04L 51/32; H04L 67/26; H04L 67/22; H04L 51/16
See application file for complete search history.

(56) References Cited

U.S. PATENT DOCUMENTS

| | | | |
|---|---|---|---|
| 2010/0030740 A1* | 2/2010 | Higgins | G06F 17/30241 715/762 |
| 2013/0297710 A1* | 11/2013 | Luber | H04L 51/02 709/206 |
| 2015/0066587 A1* | 3/2015 | Glommen | G06F 17/3089 705/7.29 |
| 2015/0067075 A1* | 3/2015 | Sheppard | H04L 51/32 709/206 |
| 2015/0199710 A1* | 7/2015 | Bell | G06Q 30/0242 705/14.41 |
| 2016/0021050 A1* | 1/2016 | Zhou | H04L 51/20 709/206 |
| 2016/0086104 A1* | 3/2016 | Wouhaybi | G06Q 10/02 705/5 |
| 2017/0199920 A1* | 7/2017 | Pearson | G06F 17/30569 |

FOREIGN PATENT DOCUMENTS

| | | |
|---|---|---|
| CN | 102789619 A | 11/2012 |
| CN | 104504098 A | 4/2015 |

OTHER PUBLICATIONS

Tencent Technology, IPRP, PCT/CN2016/082212, Apr. 3, 2018, 7 pgs.

* cited by examiner

EVENT INFORMATION SYSTEM CLASSIFYING MESSAGES USING MACHINE LEARNING CLASSIFICATION MODEL AND PUSHING SELECTED MESSAGES TO USER

RELATED APPLICATIONS

This application is a continuation-in-part application of PCT/CN2016/082212, entitled "EVENT INFORMATION PUSH METHOD, EVENT INFORMATION PUSH DEVICE AND STORAGE MEDIUM" filed on May 16, 2016, which claims priority to Chinese Patent Application No. 201510632370.1, filed with the State Intellectual Property Office of the People's Republic of China on Sep. 29, 2015, and entitled "EVENT INFORMATION PUSH METHOD AND EVENT INFORMATION PUSH APPARATUS", both of which are incorporated herein by reference in their entirety.

FIELD OF THE TECHNOLOGY

The present disclosure relates to the Internet field, and in particular, to an event information push method, an event information push apparatus, and a storage medium.

BACKGROUND OF THE DISCLOSURE

With rapid development of the Internet technologies, the speed of information communication between people is faster. Many advertisers spend a lot of resources in recommending various products to all kinds of people, and many application operators also spend a lot of resources in pushing various types of real-time information to all kinds of people, to improve market share of the operators. Every day, every user obtains a lot of information from different information channels such as mobile phones, WeChat, web pages, radio, and television.

However, some information of the foregoing information is always not interested or even hated by users. For example, advertisers or an application operators recommend products or information that users have no interest or hate, invalid information pushes may be caused, or even push channels of the advertisers and the application operators are directly blocked by the users.

Therefore, the existing network information push method lacks analysis and management for information, causing relatively low information push efficiency.

SUMMARY

Embodiments of the present disclosure provide an event information push method with relatively high push efficiency, an event information push apparatus, and a storage medium, so as to resolve a technical problem of the relatively low push efficiency of the existing event information push method and event information push apparatus.

An embodiment of the present disclosure provides an event information push method performed at a computer system having one or more processors and memory storing one or more programs to be executed by the one or more processors, the method, including:

collecting network messages from a social networking platform;

performing aggregation on the network messages, to obtain corresponding event information, the aggregation including: clustering the collected network messages into one or more categories according to a correlation degree of the network messages, and combining each category of network messages obtained through the clustering process into one piece of event information;

obtaining, for each piece of event information, one or more attributes from the corresponding category of network messages, the one or more attributes of the event information comprising event content, a propagation path, and associated user information;

obtaining, from an event information and user database, a user group corresponding to the one or more attributes of each piece of event information, the event information and user database comprising multiple event information categories, multiple user groups, and a correspondence between the event information categories and the user groups; and pushing each piece of event information to a user in the user group corresponding to the event information.

An embodiment of the present disclosure further provides a computer system having one or more processors; memory; and one or more programs stored in the memory that, when executed by the one or more processors, cause the computer system to perform a plurality of operations including:

collecting network messages from a social networking platform;

performing aggregation on the network messages, to obtain corresponding event information, the aggregation including: clustering the collected network messages into one or more categories according to a correlation degree of the network messages, and combining each category of network messages obtained through the clustering process into one piece of event information;

obtaining, for each piece of event information, one or more attributes from the corresponding category of network messages, the one or more attributes of the event information comprising event content, a propagation path, and associated user information;

obtaining, from an event information and user database, a user group corresponding to the one or more attributes of each piece of event information, the event information and user database comprising multiple event information categories, multiple user groups, and a correspondence between the event information categories and the user groups; and pushing each piece of event information to a user in the user group corresponding to the event information.

In addition, an embodiment of the present disclosure further provides a non-transitory computer readable storage medium storing one or more programs, wherein the one or more programs, when executed by one or more processors of a computer system, cause the computer system to perform a plurality of operations including:

collecting network messages from a social networking platform;

performing aggregation on the network messages, to obtain corresponding event information, the aggregation including: clustering the collected network messages into one or more categories according to a correlation degree of the network messages, and combining each category of network messages obtained through the clustering process into one piece of event information;

obtaining, for each piece of event information, one or more attributes from the corresponding category of network messages, the one or more attributes of the event information comprising event content, a propagation path, and associated user information;

obtaining, from an event information and user database, a user group corresponding to the one or more attributes of each piece of event information, the event information and user database comprising multiple event information categories, multiple user groups, and a correspondence between the event information categories and the user groups; and pushing each piece of event information to a user in the user group corresponding to the event information.

DESCRIPTION OF EMBODIMENTS

Figure 1:
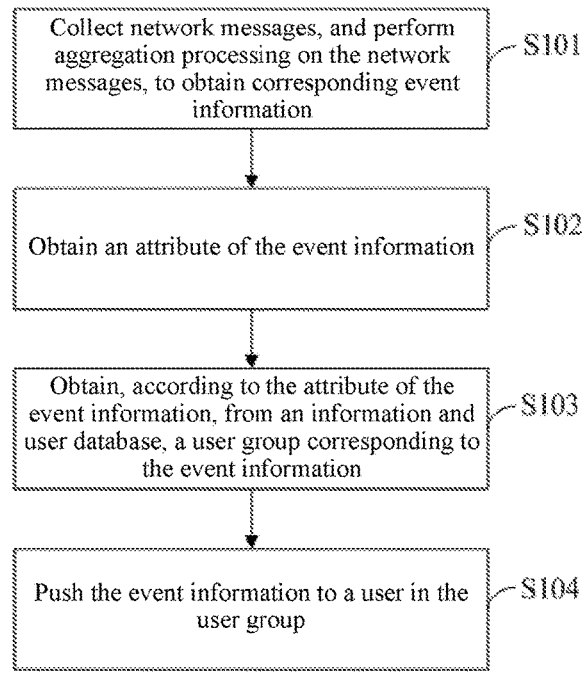
FIG. 1 is a flowchart of an event information push method according to some embodiments of the present disclosure.

Referring to the drawings, same component symbols represent same components. A principle of the present disclosure is described by using examples in which the present disclosure is implemented in proper computing environments. The following descriptions are specific Embodiments of the present disclosure based on the examples, and should not be construed as a limitation to other specific embodiments of the present disclosure that are not described herein in detail.

In the description below, the specific embodiments of the present disclosure will be described with reference to steps and signs of operations that are performed by one or more computers, unless indicated otherwise. As such, it will be understood that such operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the present disclosure is being described in the foregoing text, it is not meant to be limiting as a person skilled in the art will appreciate that various of the operations described hereinafter may also be implemented in hardware.

An event information push apparatus of the present disclosure may be implemented by using various computing devices. The computing devices include but are not limited to a personal computer, a server computer, a handheld or laptop device, a mobile device (such as a mobile phone, a personal digital assistant (PDA), or a media player), a multi-processor system, a consumer computing device, a small computer, and a large computer, and include a distributed computing environment of the foregoing any system or device, and the like. However, the computing device is preferably an event information push server, so as to effectively improve the information push efficiency of the event information push server.

Referring to FIG. 1, FIG. 1 is a flowchart of an event information push method according to some embodiments of the present disclosure. The event information push method of this embodiment includes:

Operation S101. Collect network messages, and perform aggregation processing on the network messages, to obtain corresponding event information.

Operation S102. Obtain an attribute of the event information.

Operation S103. Obtain, from an event information and user database, a user group corresponding to the one or more attributes of each piece of event information.

Operation S104. Push the event information to a user in the user group.

In some embodiments, the event information push method is implemented at a computer system supporting a social networking platform (e.g., WeChat by Tencent Inc.). WeChat enables its users to send text, audio, video messages, and webpage links to their direct contacts with whom they have a one-to-one chat. WeChat also allows a user to share such information in a group chat with other users who may or may not be the user's direct contact. In addition, the user may use a WeChat function called "Moment" to post messages or document links, which are accessible to the user's direct contacts.

From the perspective of a WeChat user, the information the user can receive is determined by the information's sender (i.e., another WeChat user) regardless of whether the receiving user is interested in the information or not. Such information is presented to the receiving user in a chronological order such that a new message or document link always appears at the top of a chat room until it is replaced by another newer message or document link. As a result, the receiving user may never have a chance of reading a message or a webpage that is of interest to the user before the message or webpage is replaced by another message. This is especially true when a group chat receives a lot of new messages or when many users post a large number of new messages or document links using the Moment function within a short time window. In this case, WeChat plays a relatively passive role of passing information from one user to other users and WeChat has little influence on what network messages a WeChat user should read or give more attention.

The event information push method disclosed in the present disclosure addresses this problem by aggregating the network messages (e.g., text, audio, video messages, and webpage links) WeChat users publish in any chat room (one-to-one chat or group chat) or using the Moment function into different events based on the keywords appearing in these network messages, the releasing time of these network messages, a propagation path of a webpage link, and their associated WeChat users using topic model based machine learning techniques and generates event-level information that serves as an abstract or synopsis of the network messages associated with a particular event.

Since each network message is associated with at least one sending user and one receiving user, it is possible to generate a user profile for each WeChat user based on the network messages the WeChat user has published, received, commented, and forwarded. In some embodiments, a WeChat user's user profile may be further enhanced by the user profiles of other WeChat users with which the WeChat user has more significant communications. For example, when the WeChat user communicates with other WeChat users that have posted many articles on Bitcoin, it is reasonable to assume that the WeChat user may also be interested in the Bitcoin related articles.

With the establishment of event-level information derived from the network messages published on a social networking platform like WeChat and user profiles derived from the network messages associated with the WeChat users, it is possible for WeChat to recommend event-level information and associated network messages (e.g., text, audio, video messages, and webpage links) to a WeChat user based on the WeChat user's user profile. This recommendation may be triggered by a user request at terminal (e.g., by selecting a Recommend function like the Moment function) or automatically pushed onto the terminal without an explicit user request.

The following describes in detail a specific procedure of the operations of the event information push method of this embodiment.

In operation S101, the event information push apparatus collects the network messages published on a social networking platform, such as text, audio, video messages, and webpage links posted by a user of the social networking platform as well as logs of message forwarding behavior through the social networking platform, and then, performs aggregation processing on the collected network messages. The aggregation processing refers to clustering the collected network messages into one or more categories according to a correlation degree of the network messages, and combining each category of network messages obtained through the clustering process into one piece of event information. In some embodiments, the correlation degree between two network messages is determined by their closeness in content (e.g., the number of keywords shared by the two messages), their closeness in time (e.g., how far apart are the releasing times of the two messages), and their closeness in user relevance (e.g., how many users in common are shared by the two messages).

A specific manner for combining each category of network messages obtained through the clustering process into one piece of event information includes but is not limited to one or multiple combinations of the following manners: deleting repeated network messages of each category of network messages obtained through the clustering process, and network messages that are of each category of network messages obtained through the clustering process and that have a time sequence are combined according to the time sequence. The network messages that have a time sequence is that an occurrence time of content included in the network messages has a sequence. For example, content included in a network message A is about an introduction before a meeting, content included in a network message B is about an introduction during the meeting, and content included in a network message C is about an introduction after the meeting.

The following describes, by using an example, a specific process of performing aggregation on the collected network messages:

For example, repeated parts of the meeting content of the network message A, the network message B, and the network message C are deleted, and then the network message A, the network message B, and the network message C are sorted and combined according to a time sequence of before the meeting, during the meeting, and after the meeting, that is, a release time sequence of the network messages, to generate event information D. The event information D no longer includes independent network message A, network message B, and network message C.

For example, many network articles report "About the escalator accident at Jingzhou shopping mall", and each network article may be used as a network message. Aggregation processing is performed on the network articles to form event information of "About the escalator accident at Jingzhou shopping mall". Then, turn to operation S102.

In operation S102, the event information push apparatus obtains the attribute of the event information obtained in operation S101, where the attribute of the event information includes event content, a propagation path, associated user information, and the like. The event content is specific content in the event information. The event content herein may be the superposition of content of multiple network messages.

The propagation path refers to an attribute of a propagation tree (propagation channel) of the event information, such as the depth and width of the propagation tree and a quantity of leaves at each layer. The propagation path herein may be a quantity of layers of a propagation tree formed after propagation paths of multiple network messages are superimposed and a proportional relationship between leaves at each layer. For example, if a quantity of layers of a propagation tree of a network message a is 3, and a quantity of leaves at each layer is 1:4:9; and if a quantity of layers of a propagation tree of a network message b is 4, and a quantity of leaves at each layer is 1:4:9:16, a quantity of layers of time information c obtained after the network message a and the network message b are combined is 4, a quantity of leaves at each layer after the superimposing is 2:8:18:16, and a proportional relationship between leaves at each layer is 1:4:9:8. Therefore, through analysis on the propagation tree of the event information, the propagation depth and propagation width of the event information may be known.

The associated user information refers to the gender, age, geographical distribution and the like of a user who propagates the event information. The associated user information herein may be the superposition of the gender, age, and geographical distribution of browse users of multiple network messages. Then, turn to operation S103.

In operation S103, the event information push apparatus obtains, according to the one or more attributes of each piece of event information obtained in operation S102, from the event information and user database, the user group corresponding to the event information. The event information and user database includes multiple event information categories, multiple user groups, and a correspondence between the event information categories and the user groups. Herein, according to multiple attributes of the event information, multiple event information categories corresponding to the event information may be obtained, and multiple user groups corresponding to the event information are further obtained. Then, turn to operation S104.

In operation S104, the event information push apparatus pushes the event information obtained in operation S101 to the user in the user group obtained in operation S103. As noted above, the event information may be pushed to a user' terminal in response to a user selection of the Recommend function so that the user can browse the messages published by other users that are deemed to be of interest to the user. In some embodiments, the event information may be presented to the user in a format different from the other ways supported by the social networking platform. For example, a graphical user interface including the event information and a search box is presented on the terminal. Through the search box, the user can submit search terms to the social networking platform and receive more refined search results derived from the event information. In some other embodiments, the user is presented with a graphical user interface including the specific network messages associated with the event information in response to a user selection of the event information. The graphical user interface may be the same as the one-to-one chat, the group chat or the Moment function such that the user can not only browse the specific network messages and also other messages that were published around the same time frame serving as the context for the specific messages. Regardless of the format, the event information should be only derived from the network messages that are accessible to the user. In other words, the user is not allowed to see network messages shared by another user of the social networking platform with the user either in one-to-one chat or in a group chat of which both users are members.

In this way, an event information push process of the event information push method of this embodiment is completed.

By means of the event information push method of this embodiment, an event information and user database is established, a designated push of event information is implemented, and the event information push efficiency is improved.

Figure 2:
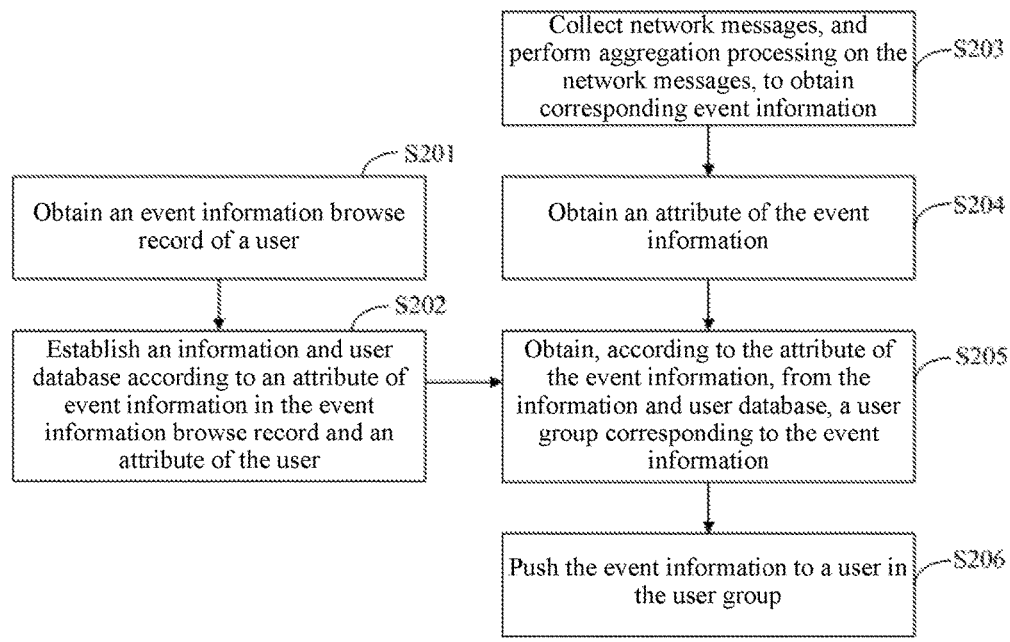
FIG. 2 is a flowchart of an event information push method according to some embodiments of the present disclosure.

Referring to FIG. 2, FIG. 2 is a flowchart of an event information push method according to some embodiments of the present disclosure. The event information push method of this embodiment includes:

Operation S201. Obtain an event information browse record of a user.

Operation S202. Establish an event information and user database according to an attribute of event information in the event information browse record and one or more attributes of the user.

Operation S203. Collect network messages, and perform aggregation processing on the network messages, to obtain the corresponding event information.

Operation S204. Obtain the attribute of the event information.

Operation S205. Obtain, according to the one or more attributes of each piece of event information, from the event information and user database, a user group corresponding to the event information.

Operation S206. Push the event information to a user in the user group.

The following describes in detail a specific procedure of the operations of the event information push method of this embodiment.

In operation S201, an event information push apparatus obtains the event information browse record of the user, where the information browse record includes event information browsed by the user and user information of the browse user. In some embodiments, the event information browse record of the user includes all the messages related to the event that has been published, received, commented and forwarded by the user and it is used for generating a user profile for the user. Then, turn to operation S202.

Figure 3:
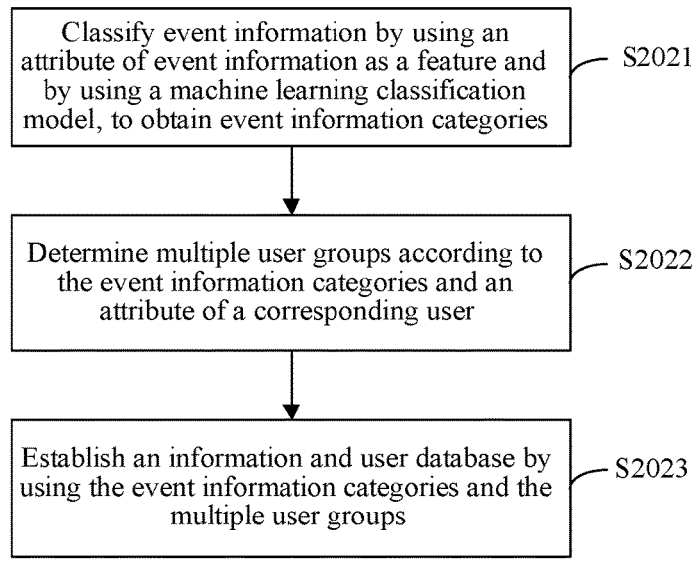
FIG. 3 is a flowchart of operation S202 of an event information push method according to some embodiments of the present disclosure.

In operation S202, the event information push apparatus establishes the event information and user database according to the one or more attributes of each piece of event information in the event information browse record obtained in the operation S201 and the attribute of the user. Specifically, referring to FIG. 3, FIG. 3 is a flowchart of operation S202 of an event information push method according to some embodiments of the present disclosure. Operation S202 includes:

Operation S2021. Classify the event information by using the attributes of the event information as a feature and by using a machine learning classification model, to obtain event information categories.

Operation S2022. Determine multiple user groups according to the event information categories and the one or more attributes of the corresponding user.

Operation S2023. Establish the event information and user database by using the event information categories and the multiple user groups.

In operation S2021, the event information push apparatus classifies the event information by using the attributes of the event information in the event information browse record as a feature and by using the machine learning classification model such as a softmax model or a maximum entropy model, so as to obtain the multiple event information categories. Then, turn to operation S2022.

In operation S2022, the event information push apparatus collects statistics for users who browse event information of a same category, to determine attributes of the users corresponding to the category of the event information, to further determine multiple user groups. For example, a lot of men like to browse military news, and event information of the military news type may be associated with male users, so as to establish a male user group associated the event information of the military news type. For example, a lot of women like to browse soul soother articles, and event information of the soul soother articles is associated with female users, so as to establish a female user group associated with the event information of the soul soother articles. Then, turn to operation S2023.

In operation S2023, the event information push apparatus establishes the event information and user database by using the event information categories obtained in operation S2021 and the user group obtained in operation S2022. Then, turn to operation S203.

Figure 4:
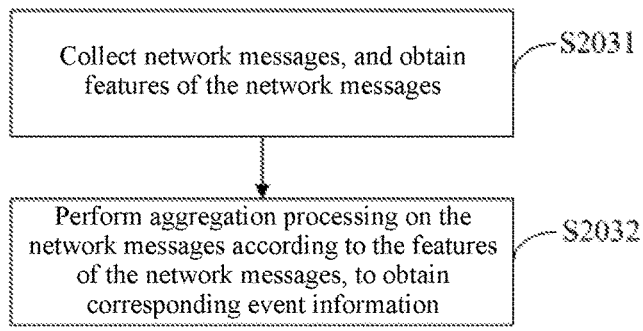
FIG. 4 is a flowchart of operation S203 of an event information push method according to some embodiments of the present disclosure.

In operation S203, the event information push apparatus collects the network messages, and performs aggregation processing on the network messages, to obtain the corresponding event information. Specifically, referring to FIG. 4, FIG. 4 is a flowchart of operation S203 of an event information push method according to some embodiments of the present disclosure. Operation S203 includes:

Operation S2031. Collect the network messages, and obtain features of the network messages.

Operation S2032. Perform aggregation processing on the network messages according to the features of the network messages, to obtain the corresponding event information.

In operation S2031, the event information push apparatus collects the network messages, such as text, audio, video messages, and webpage links posted by a user of the social networking platform as well as logs of message forwarding behavior through the social networking platform, and obtains features of the network messages, where the features of the network messages include description content, a message form, and a related link. The description content refers to specific content in the network message; the message form refers to a propagation form of the network message; and the related link refers to a network link included in the network message. Then, turn to operation S2032.

In operation S2032, the event information push apparatus performs aggregation processing on the collected network messages according to the features of the network messages obtained in operation S2031, such as deleting repeated content in the network messages, or sorting the network messages according to a release time sequence, to obtain the corresponding event information. For example, repeated content of the network message A, the network message B, and the network message C are deleted, and then the network message A, the network message B, and the network message C are sorted according to a release time sequence of the network messages, to generate event information D. The event information D no longer includes independent network message A, network message B and network message C.

For example, many network articles report "About the escalator accident at Jingzhou shopping mall", and each network article may be used as a network message. Aggregation processing is performed on the network articles to form event information of "About the escalator accident at Jingzhou shopping mall". Because aggregation processing is performed according to the features of the network messages, the speed and effectiveness of the aggregation are improved. Then, turn to operation S204.

In operation S204, the event information push apparatus obtains the attribute of the event information obtained in operation S203, where the attribute of the event information includes event content, a propagation path, associated user information, and the like. The event content is specific content in the event information. The event content herein may be the superposition of content of multiple network messages. The propagation path refers to an attribute of a propagation tree (propagation channel) of the event information, such as the depth and width of the propagation tree and a quantity of leaves at each layer. The propagation path herein may be a quantity of layers of a propagation tree formed after propagation paths of multiple network messages are superimposed and a proportional relationship between leaves at each layer. Through analysis on the propagation tree of the event information, the propagation depth and propagation width of the event information may be known. The associated user information refers to the gender, age, geographical distribution and the like of a user who propagates the event information. The associated user information herein may be the superposition of the gender, age, and geographical distribution of browse users of multiple network messages. Then, turn to operation S205.

In operation S205, the event information push apparatus obtains, according to the one or more attributes of each piece of event information obtained in operation S204, from the event information and user database, the user group corresponding to the event information. The event information and user database includes multiple event information categories, multiple user groups, and a correspondence between the event information categories and the user groups. Herein, according to multiple attributes of the event information, multiple event information categories corresponding to the event information may be obtained, and multiple user groups corresponding to the event information are further obtained. Then, turn to operation S206.

In operation S206, the event information push apparatus pushes the event information obtained in operation S205 to the user in the user group obtained in operation S203.

Preferably, to further improve the event information push efficiency, in this embodiment, the event information push apparatus further obtains at least one piece of similar event information whose similarity to the pushed event information is greater than a first set value and that is for pushing, where the similar event information and the event information belong to a same event information category in the event information and user database. The similarity herein may be a similarity degree of keywords in the event information and the similar event information, and the first set value may be set according to a requirement of the user.

For example, similar event information of the event information of "About the escalator accident at Jingzhou shopping mall" may be event information such as "About the elevator accident at a community in Shenzhen". When a user watches certain event information, the user generally focuses on whether the event information often happens or whether the event information happens in the neighborhood. Therefore, pushing the similar event information to users in the corresponding user group also has relatively high effectiveness.

Preferably, to further improve the event information push efficiency, in this embodiment, the event information push apparatus subsequently may further obtain at least one piece of subsequent event information of the pushed event information for pushing, where the subsequent event information and the corresponding event information have same event keywords, and a release time of the subsequent event information is later than a release time of the event information.

For example, "Report about processing of the responsible person for the escalator accident at Jingzhou shopping mall" and the event information of "About the escalator accident at Jingzhou shopping mall" have same keywords "the escalator accident at Jingzhou shopping mall", and a release time of "Report about processing of the responsible person for the escalator accident at Jingzhou shopping mall" is later than a release time of "About the escalator accident at Jingzhou shopping mall". When the user has interest in certain event information, the user generally also has interest in other subsequent event information. Therefore, pushing the subsequent event information to users in the corresponding user group subsequently has relatively high effectiveness.

Preferably, to further improve the event information push efficiency, in this embodiment, the event information push apparatus further obtains at least one piece of related event information of the pushed event information for pushing, where the related event information is event information whose user browse frequency is greater than a second set value after the user browses the event information. The related event information is completely determined by using the user browse frequency, and the related event information and the event information may belong to different event information categories in the event information and user database. The second set value may be set according to a requirement of the user.

For example, after browsing the event information of "About the escalator accident at Jingzhou shopping mall", the user may watch related event information of "What to do when an elevator is faulty. Therefore, pushing the related event information to users in the corresponding user group also has relatively high effectiveness.

In this way, an event information push process of the event information push method of this embodiment is completed.

Based on some embodiments of the event information push method of this embodiment, an event information and user database is established by using an event information browse record of a user; and similar event information, subsequent event information, and related event information are pushed to corresponding users, thereby further improving the event information push efficiency.

Figure 5:
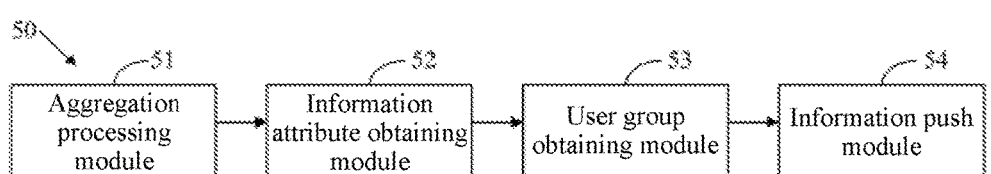
FIG. 5 is a schematic structural diagram of an event information push apparatus according to some embodiments of the present disclosure.

The present disclosure further provides an event information push apparatus. Referring to FIG. 5, FIG. 5 is a schematic structural diagram of an event information push apparatus according to some embodiments of the present disclosure. The event information push apparatus 50 of this embodiment includes an aggregation processing module 51, an information attribute obtaining module 52, a user group obtaining module 53, and an information push module 54. The aggregation processing module 51 is configured to collect network messages, and perform aggregation processing on the network messages, to obtain corresponding event information. The information attribute obtaining module 52 is configured to obtain an attribute of the event information, where the attribute of the event information includes event content, a propagation path, and associated user information. The user group obtaining module 53 is configured to obtain, from an event information and user database, a user group corresponding to the one or more attributes of each piece of event information, where the event information and user database includes multiple event information categories, multiple user groups, and a correspondence between the event information categories and the user groups. The information push module 54 is configured to push the event information to a user in the user group.

When the event information push apparatus 50 of this embodiment is used, first, the aggregation module 51 collects the network messages, such as text, audio, video messages, and webpage links posted by a user of the social networking platform as well as logs of message forwarding behavior through the social networking platform, and then, performs aggregation processing on the collected network messages, such as deleting repeated content in the network messages, or sorting the network messages according to a release time sequence, to obtain the corresponding event information. For example, repeated content of the network message A, the network message B, and the network message C are deleted, and then the network message A, the network message B, and the network message C are sorted according to a release time sequence of the network messages, to generate event information D. The event information D no longer includes independent network message A, network message B and network message C.

For example, many network articles report "About the escalator accident at Jingzhou shopping mall", and each network article may be used as a network message. Aggregation processing is performed on the network articles to form event information of "About the escalator accident at Jingzhou shopping mall".

Then, the information attribute obtaining module 52 obtains the attribute of the event information obtained by the aggregation module, where the attribute of the event information includes event content, a propagation path, associated user information, and the like. The event content is specific content in the event information. The event content herein may be the superposition of content of multiple network messages. The propagation path refers to an attribute of a propagation tree (propagation channel) of the event information, such as the depth and width of the propagation tree and a quantity of leaves at each layer. The propagation path herein may be a quantity of layers of a propagation tree formed after propagation paths of multiple network messages are superimposed and a proportional relationship between leaves at each layer. Through analysis on the propagation tree of the event information, the propagation depth and propagation width of the event information may be known. The associated user information refers to the gender, age, geographical distribution and the like of a user who propagates the event information. The associated user information herein may be the superposition of the gender, age, and geographical distribution of browse users of multiple network messages.

Then, the user group obtaining module 53 obtains, according to the one or more attributes of each piece of event information obtained by the information attribute obtaining module 52, from the event information and user database, the user group corresponding to the event information. The event information and user database includes multiple event information categories, multiple user groups, and a correspondence between the event information categories and the user groups. Herein, according to multiple attributes of the event information, multiple event information categories corresponding to the event information may be obtained, and multiple user groups corresponding to the event information are further obtained.

Finally, the information push module 54 pushes the event information obtained by the aggregation module 51 to the user in the user group obtained by the user group obtaining module 53.

In this way, an event information push process of the event information push apparatus 50 of this embodiment is completed.

By means of the event information push apparatus of this embodiment, an event information and user database is established, a designated push of event information is implemented, and the event information push efficiency is improved.

Figure 6:
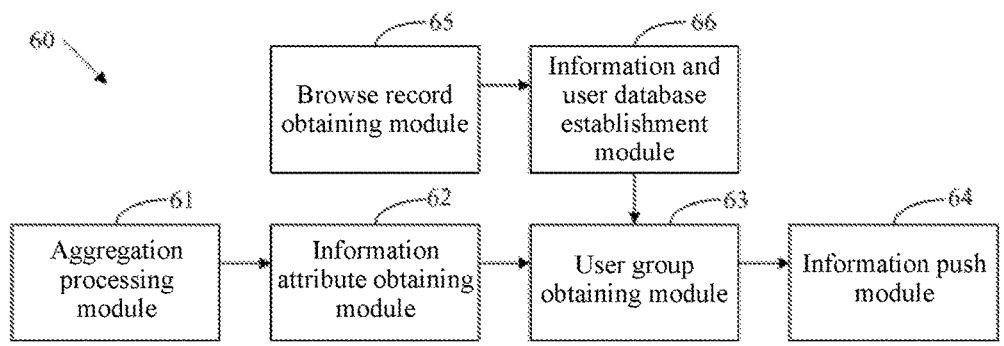
FIG. 6 is a schematic structural diagram of an event information push apparatus according to some embodiments of the present disclosure.

Referring to FIG. 6, FIG. 6 is a schematic structural diagram of an event information push apparatus according to some embodiments of the present disclosure. The event information push apparatus 60 of this embodiment includes an aggregation processing module 61, an information attribute obtaining module 62, a user group obtaining module 63, an information push module 64, a browse record obtaining module 65, and an event information and user database establishment module 66.

Based on some embodiments, the event information push apparatus 60 of this embodiment further includes the browse record obtaining module 65 and the event information and user database establishment module 66. The browse record obtaining module 65 is configured to obtain an event information browse record of a user. The event information and user database establishment module 66 is configured to establish an event information and user database according to an attribute of event information in the event information browse record and one or more attributes of the user.

Figure 7:
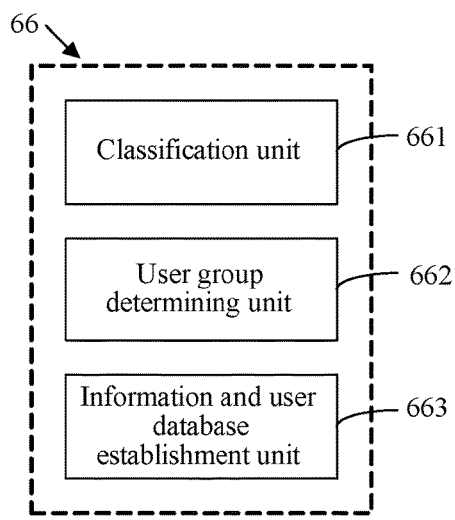
FIG. 7 is a schematic structural diagram of an event information and user database establishment module of an event information push apparatus according to some embodiments of the present disclosure.

Referring to FIG. 7, FIG. 7 is a schematic structural diagram of an event information and user database establishment module of an event information push apparatus according to some embodiments of the present disclosure. The event information and user database establishment module 66 includes a classification unit 661, a user group determining unit 662, and an event information and user database establishment unit 663. The classification unit 661 is configured to classify the event information by using the attributes of the event information as a feature and by using a machine learning classification model, to obtain event information categories. The user group determining unit 662 is configured to determine multiple user groups according to the event information categories and the one or more attributes of the corresponding user. The event information and user database establishment unit 663 is configured to establish the event information and user database by using the event information categories and the multiple user groups.

Figure 8:
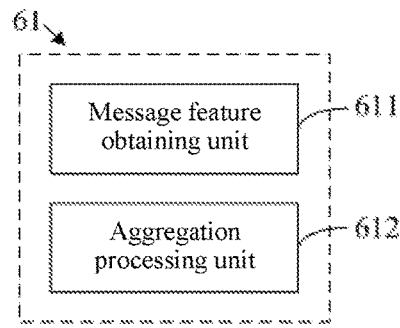
FIG. 8 is a schematic structural diagram of an aggregation processing module of an event information push apparatus according to some embodiments of the present disclosure.

Referring to FIG. 8, FIG. 8 is a schematic structural diagram of an aggregation processing module of an event information push apparatus according to some embodiments of the present disclosure. The aggregation processing module 61 includes a message feature obtaining unit 611 and an aggregation processing unit 612. The message feature obtaining unit 611 is configured to collect the network messages, and obtain features of the network messages. The features of the network messages include description content, a message form, and a related link. The aggregation processing unit 612 is configured to perform aggregation processing on the network messages according to the features of the network messages, to obtain corresponding event information.

Figure 9:
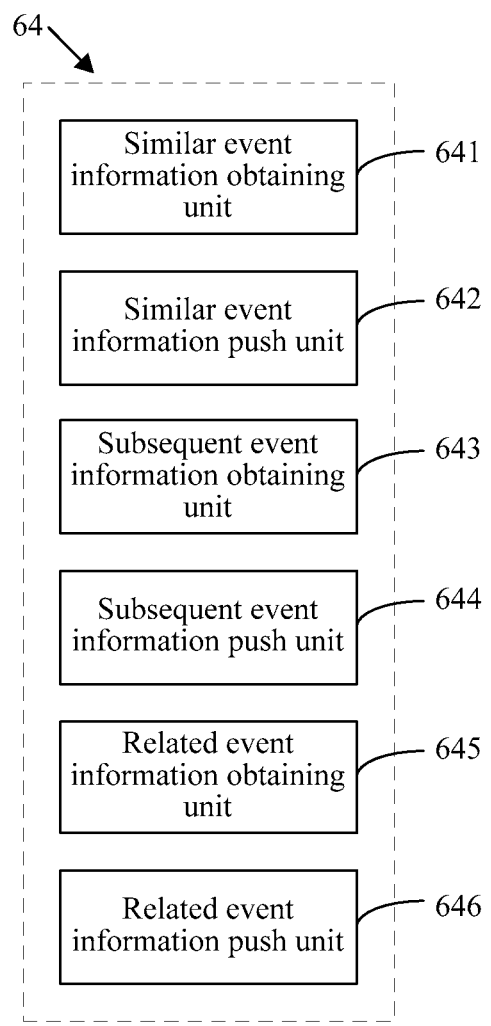
FIG. 9 is a schematic structural diagram of an information push module of an event information push apparatus according to some embodiments of the present disclosure.

Referring to FIG. 9, FIG. 9 is a schematic structural diagram of an information push module of an event information push apparatus according to some embodiments of the present disclosure. The information push module 64 includes a similar event information obtaining unit 641, a similar event information push unit 642, a subsequent event information obtaining unit 643, a subsequent event information push unit 644, a related event information obtaining unit 645, and a related event information push unit 646.

The similar event information obtaining unit 641 is configured to obtain at least one piece of similar event information whose similarity to the event information is greater than a first set value, where the similar event information and the event information belong to a same event information category in the event information and user database. The similar event information push unit 642 is configured to push the similar event information to the user in the user group. The subsequent event information obtaining unit 643 is configured to obtain at least one piece of subsequent event information of the event information, where the subsequent event information and the event information have same event keywords, and a release time of the subsequent event information is later than a release time of the event information. The subsequent event information push unit 644 is configured to push the subsequent event information to the user in the user group. The related event information obtaining unit 645 is configured to obtain at least one piece of related event information of the event information, where the related event information is event information whose user browse frequency is greater than a second set value after the user browses the event information. The related event information push unit 646 is configured to push the related event information to the user in the user group.

When the event information push apparatus 60 of this embodiment is used, first, the browse record obtaining module 65 obtains the event information browse record of the user, where the information browse record includes event information browsed by the user and user information of the browse user.

Then, the event information and user database establishment module establishes the event information and user database according to the one or more attributes of each piece of event information in the event information browse record obtained by the browse record obtaining module 65 and the attribute of the user. Specifically:

The classification unit 661 of the event information and user database establishment module 66 classifies the event information by using the attributes of the event information in the event information browse record as a feature and by using a machine learning classification model such as a softmax model or a maximum entropy model, so as to obtain multiple event information categories.

The user group determining unit 662 of the event information and user database establishment module 66 collects statistics for users who browse event information of a same category, to determine attributes of the users corresponding to the category of the event information, to further determine multiple user groups. For example, a lot of men like to browse military news, and event information of the military news type may be associated with male users, so as to establish a male user group associated the event information of the military news type. For example, a lot of women like to browse soul soother articles, and event information of the soul soother articles is associated with female users, so as to establish a female user group associated with the event information of the soul soother articles.

The event information and user database establishment unit 663 of the event information and user database establishment module 66 establishes the event information and user database by using the event information categories obtained by the classification unit and the user group obtained by the user group determining unit.

Then, the aggregation module 61 collects the network messages, and performs aggregation processing on the network messages, to obtain the corresponding event information. Specifically:

The message feature obtaining unit 611 of the aggregation module 61 collects the network messages, such as text, audio, video messages, and webpage links posted by a user of the social networking platform as well as logs of message forwarding behavior through the social networking platform, and obtains features of the network messages, where the features of the network messages include description content, a message form, and a related link. The description content refers to specific content in the network message; the message form refers to a propagation form of the network message; and the related link refers to a network link in the network message.

The aggregation processing unit 612 of the aggregation module 61 performs aggregation processing on the collected network messages according to the features of the network messages obtained by the message feature obtaining unit, such as deleting repeated content in the network messages, or sorting the network messages according to a release time sequence, to obtain the corresponding event information. For example, repeated content of the network message A, the network message B, and the network message C are deleted, and then the network message A, the network message B, and the network message C are sorted according to a release time sequence of the network messages, to generate event information D. The event information D no longer includes independent network message A, network message B and network message C.

For example, many network articles report "About the escalator accident at Jingzhou shopping mall", and each network article may be used as a network message. Aggregation processing is performed on the network articles to form event information of "About the escalator accident at Jingzhou shopping mall". Because aggregation processing is performed according to the features of the network messages, the speed and effectiveness of the aggregation are improved.

Then, the information attribute obtaining module 62 obtains the attribute of the event information obtained by the aggregation module 61, where the attribute of the event information includes event content, a propagation path, associated user information, and the like. The event content is specific content in the event information. The event content herein may be the superposition of content of multiple network messages. The propagation path refers to an attribute of a propagation tree (propagation channel) of the event information, such as the depth and width of the propagation tree and a quantity of leaves at each layer. The propagation path herein may be a quantity of layers of a propagation tree formed after propagation paths of multiple network messages are superimposed and a proportional relationship between leaves at each layer. Through analysis on the propagation tree of the event information, the propagation depth and propagation width of the event information may be known. The associated user information refers to the gender, age, geographical distribution and the like of a user who propagates the event information. The associated user information herein may be the superposition of the gender, age, and geographical distribution of browse users of multiple network messages.

Then, the user group obtaining module 63 obtains, according to the one or more attributes of each piece of event information obtained by the information attribute obtaining module 62, from the event information and user database, the user group corresponding to the event information. The event information and user database includes multiple event information categories, multiple user groups, and a correspondence between the event information categories and the user groups. Herein, according to multiple attributes of the event information, multiple event information categories corresponding to the event information may be obtained, and multiple user groups corresponding to the event information are further obtained.

Finally, the information push module 64 pushes the event information obtained by the aggregation module 62 to the user in the user group obtained by the user group obtaining module 63.

Preferably, to further improve the event information push efficiency, in this embodiment, the information push module 64 includes a similar event information obtaining unit 641 and a similar event information push unit 642. The similar event information obtaining unit 641 further obtains at least one piece of similar event information whose similarity to the pushed event information is greater than a first set value and that is for pushing, where the similar event information and the event information belong to a same event information category in the event information and user database. The similarity herein may be a similarity degree of keywords in the event information and the similar event information, and the first set value may be set according to a requirement of the user.

For example, similar event information of the event information of "About the escalator accident at Jingzhou shopping mall" may be event information such as "About the elevator accident at a community in Shenzhen". When a user watches certain event information, the user generally focuses on whether the event information often happens or whether the event information happens in the neighborhood. Therefore, the similar event information push unit 642 pushing the similar event information to users in the corresponding user group also has relatively high effectiveness.

Preferably, to further improve the event information push efficiency, in this embodiment, the information push module 64 further includes a subsequent event information obtaining unit 643 and a subsequent event information push unit 644. The subsequent event information obtaining unit 643 may further obtain at least one piece of subsequent event information of the pushed event information for pushing, where the subsequent event information and the corresponding event information have same event keywords, and a release time of the subsequent event information is later than a release time of the event information.

For example, "Report about processing of the responsible person for the escalator accident at Jingzhou shopping mall" and the event information of "About the escalator accident at Jingzhou shopping mall" have same keywords "the escalator accident at Jingzhou shopping mall", and a release time of "Report about processing of the responsible person for the escalator accident at Jingzhou shopping mall" is later than a release time of "About the escalator accident at Jingzhou shopping mall". When the user has interest in certain event information, the user generally also has interest in other subsequent event information. Therefore, the subsequent event information push unit 644 pushing the subsequent event information to users in the corresponding user group also has relatively high effectiveness.

Preferably, to further improve the event information push efficiency, in this embodiment, the information push module 64 includes a related event information obtaining unit 645 and a related event information push unit 646. The related event information obtaining unit 645 further obtains at least one piece of related event information of the event information for pushing, where the related event information is event information whose user browse frequency is greater than a second set value after the user browses the event information. The related event information is completely determined by using the user browse frequency, and the related event information and the event information may belong to different event information categories in the event information and user database. The second set value may be set according to a requirement of the user.

For example, after browsing the event information of "About the escalator accident at Jingzhou shopping mall", the user may watch related event information of "What to do when an elevator is faulty. Therefore, the related event information push unit 646 pushing the related event information to users in the corresponding user group also has relatively high effectiveness.

In this way, an event information push process of the event information push apparatus 60 of this embodiment is completed.

Based on some embodiments of the event information push apparatus of this embodiment, an event information and user database is established by using an event information browse record of a user; and similar event information, subsequent event information, and related event information are pushed to corresponding users, thereby further improving the event information push efficiency.

The following describes a specific work principle of the event information push method and the event information push apparatus of the present disclosure by using a specific embodiment.

First, the event information push apparatus or an event information push server establishes an event information and user database by using an event information browse record of a user.

Figure 10:
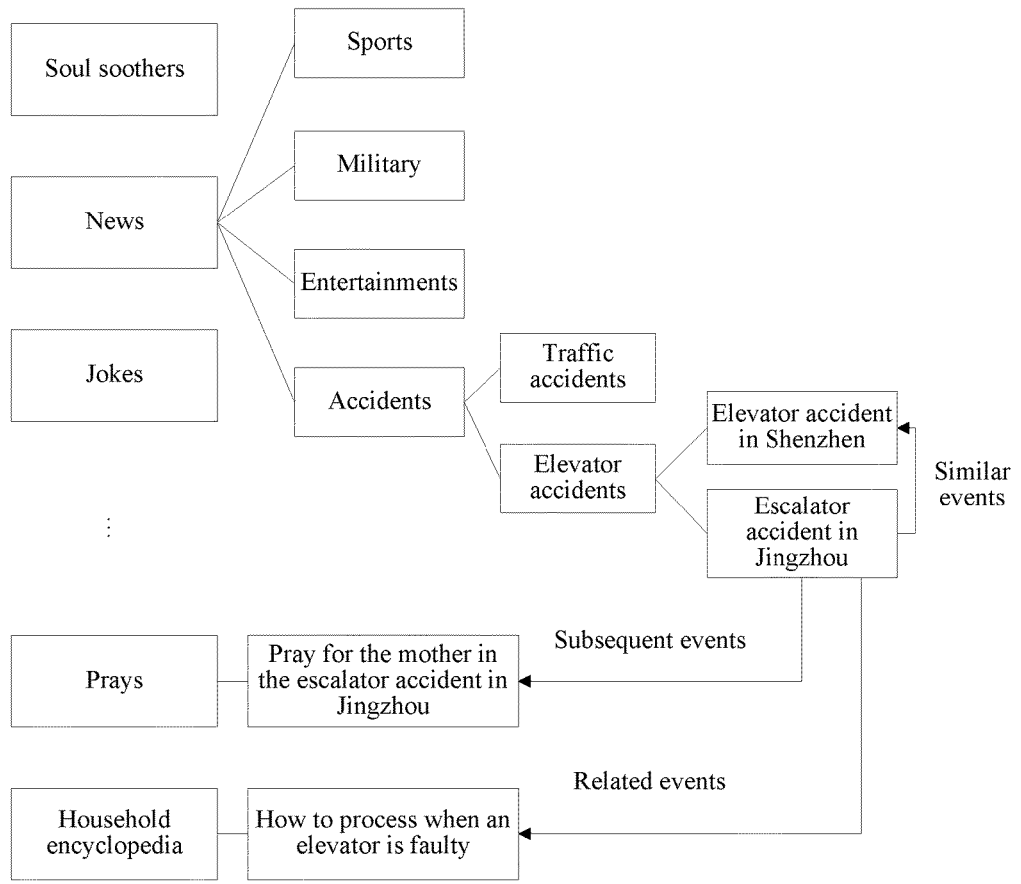
FIG. 10 is a schematic structural diagram of an event information and user database of an event information push method and an event information push apparatus according to some embodiments of the present disclosure.

That is, the event information push apparatus collects statistics for big data of the event information browse record of the user. Herein, a machine learning classification model may be used to classify event information, and determine multiple event information categories. Users who browse the event information are divided to determine multiple user groups. An event information and user database is established according to an association between the event information categories and the user groups. The structure of the event information and user database is shown in FIG. 10. FIG. 10 shows the event information categories in the event information and user database, and each category has a corresponding user group (not shown in FIG. 10).

Then, when collecting new event information such as "The escalator accident in Jingzhou", the event information push apparatus obtains an attribute of the event information, and determines an event information category of the event information in the event information and user database by using the attributes of the event information. Same event information may belong to multiple event information categories according to different attributes.

Then, the event information push apparatus determines, according to the obtained event information category, a user group corresponding to the event information.

Finally, the new event information is pushed to users in the user group. Further, similar event information of the event information, such as "Elevator accidents in Shenzhen" and related event information, such as "How to process when an elevator is faulty" may be sent to the users in the user group as required. For example, subsequent event information of the event information collected subsequently, such as "Pray for the mother in the escalator accident in Jingzhou" may also be sent to the users in the user group as required.

In this way, information push processes of the event information push method and the event information push apparatus of the present disclosure are completed.

By means of the event information push method, the event information push apparatus, and the storage medium of the present disclosure, an event information and user database is established, a designated push of event information is implemented, and the event information push efficiency is improved; and a technical problem of the relatively low push efficiency of the existing event information push method and event information push apparatus is resolved.

The terms "component", "module", "system", "interface", "process" and the like used in this application generally refer to computer related entities: hardware, a combination of hardware and software, and software or software in execution. For example, the component may be but not limited to a process, a processor, an object, an executable application, a thread of execution, a program and/or a computer running in a processor. Through the drawings, both an application running in a controller and the controller may be components. One or more components may be in a process of execution and/or a thread, and the components may be located in a computer and/or distributed between two or more computers.

Moreover, the subject required to be protected may be implemented by using standard programming and/or an engineering technology to produce software, firmware, hardware, or any other combination thereof, to control a computer to implement a method, an apparatus, or an article of manufacture of the disclosed subject. The term "article of manufacture" used in the specification is intended to include a computer program accessible from any computer-readable device, carrier, or medium. Certainly, a person skilled in the art may be aware that modifications may be performed on the configuration without departing from the scope and spirit of the subject required to be protected.

Figure 11:
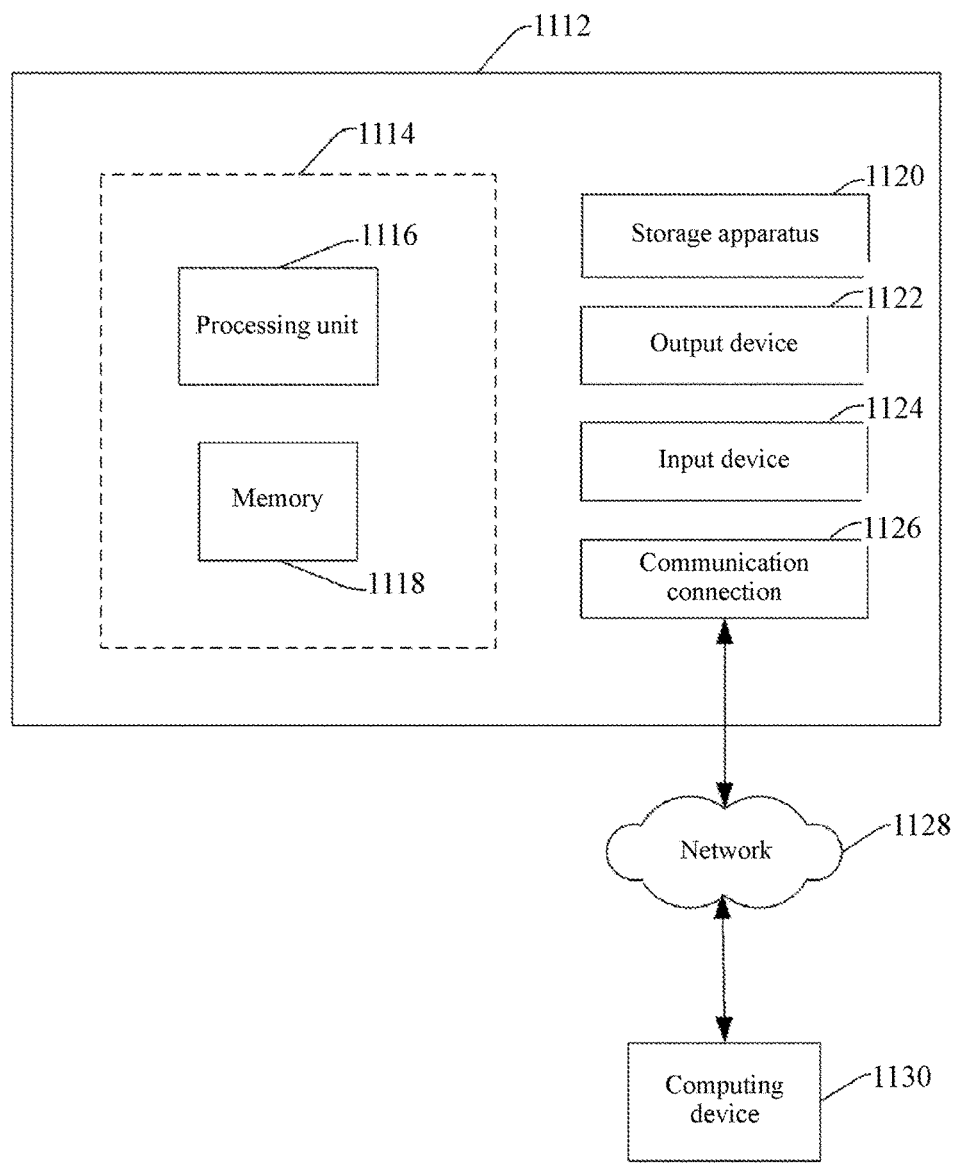
FIG. 11 is a schematic structural diagram of a work environment of a computing device in which an event information push apparatus is located according to some embodiments of the present disclosure.

FIG. 11 and the following discussions provide a short and general description of a work environment of a computing device in which the event information push apparatus for implementing the present disclosure is located. The work environment of FIG. 11 is only an example of a suitable work environment and does not aim to suggest any limitation to the scope of the purpose and function about the work environment. In the example, the computing devices 1112 include but are not limited to a personal computer, a server computer, a handheld or laptop device, a mobile device (such as a mobile phone, a PDA, a media player), a multi-processor system, a consumer computing device, a small computer, and a large computer, and include a distributed computing environment of the foregoing any system or device, and the like.

Although not required, the embodiments are described in a general background in which a "computer-readable instruction" is executed by one or more computing devices. The computer-readable instruction may be distributed by a computer-readable medium (discussed in the following). The computer-readable instruction may be implemented as a program module, for example, a function, an object, an application programming interface (API), or a data structure for executing a specific task or implementing a specific abstract data type. Typically, the functions of the computer-readable instruction may be combined or distributed randomly in various environments.

FIG. 11 shows an example of a computer system 1112 of some embodiments including the event information push apparatus of the present disclosure. In a configuration, the computer system 1112 includes at least one processing unit 1116 and a memory 1118. According to the exact configuration and type of the computing device, the memory 1118 may be volatile (such as a RAM), nonvolatile (such as a ROM, or a flash memory) or a combination thereof. The configuration is shown by a dotted line in FIG. 1114.

In other embodiments, the computer system 1112 may include an additional feature and/or function. For example, the device 1112 may further include an additional storage apparatus (such as removable and/or non-removable), which includes but not limited to a magnetic storage apparatus, an optical storage apparatus, and the like. The additional storage apparatus is shown as a storage apparatus 1120 in FIG. 11. In an embodiment, the computer-readable instruction used for implementing some embodiments provided in the specification may be in the storage apparatus 1120. The storage apparatus 1120 may further store other computer-readable instructions used for implementing an operation system, an application program, and the like. The computer-readable instruction may be loaded in the memory 1118 and executed by, for example, the processing unit 1116.

The term "non-transitory computer-readable medium" used in the specification includes a computer storage medium. The computer storage medium includes volatile and nonvolatile, removable and non-removable media that are implemented by any method or technology and that are configured to store information such as a computer-readable instruction, or other data. The memory 1118 and the storage apparatus 1120 are examples of the computer storage medium. The computer storage medium includes but is not limited to a RAM, a ROM, an EEPROM, a flash memory or another memory technology, a CD-ROM, a digital video disk (DVD) or another optical storage apparatus, a cassette, a tape, magnetic storage apparatus or another magnetic storage device, or any other media that may be configured to store expected information and may be accessed by the computer system 1112. Any such computer storage medium may be a part of the computer system 1112.

The computer system 1112 may further include a communication connection 1126 that allows the computer system 1112 to communicate with other devices. The communication connection 1126 may include but is not limited to a modem, a network interface card (NIC), an integrated network interface, radio frequency transmitter/receiver, an infrared port, a USB connector or another interface configured to connect the computer system 1112 to another computing device. The communication connection 1126 may include a wired connection or a wireless connection. The communication connection 1126 may transmit and/or receive communication media.

The term "computer-readable medium" may include a communication medium. The communication medium typically includes a computer-readable instruction or other data such as a carrier or other data in a "modulated data signal" of another transmission mechanism, and includes any information delivery medium. The term "modulated data signal" may include such a signal: one or more of the signal characteristics are set or changed according to a manner of encoding information to a signal.

The computer system 1112 may include an input device 1124, such as a keyboard, a mouse, a stylus, a voice input device, a touch input device, an infrared camera, a video input device, and/or any other input device. The device 1112 may also include an output device 1122, such as one or more displays, a loudspeaker, a printer and/or any other output device. The input device 1124 and the output device 1122 may be connected to the computer system 1112 through the wired connection, the wireless connection, or any combination thereof. In an embodiment, an input device or an output device from another computing device may be used as an input device 1124 or an output device 1122 of the computer system 1112.

The components of the computer system 1112 may be connected by means of various interconnections (such as buses). Such interconnections may include a peripheral component interconnect (PCI) (such as PCI express), a universal serial bus (USB), the fire wire (IEEE 1394), an optical bus structure, and the like. In another embodiment, the components of the computer system 1112 may be interconnected through a network. For example, the memory 1118 may be formed by multiple physical memory units that are located in different positions and that are interconnected through a network.

A person skilled in the art may know that, the storage device configured to store the computer-readable instruction may be distributed across networks. For example, the computing device 1130 that may be accessed by a network 1128 may store the computer-readable instruction used for implementing some embodiments provided in the present disclosure. The computer system 1112 may access the computing device 1130 and download some or all computer-readable instructions for execution. Alternatively, the computer system 1112 may download multiple computer-readable instructions as required, or some instructions may be executed by the computer system 1112 and some instructions may the executed by the computing device 1130.

The specification provides various operations of the embodiments. In an embodiment, the one or more operations may constitute one or more computer-readable instructions stored in a computer-readable medium, and when executed by a computing device, the computer-readable instructions enable a computing device to perform the operations. Describing an order of some or all operations shall not be interpreted as implying that the operations must be order related. Persons skilled in the art will understand an alternative sequence having the benefits of the specification. Moreover, it should be understood that not all operations necessarily exist in each embodiment provided in the specification.

Moreover, the word "preferred" used in the specification is used for an instance, an example, or an illustration. Any aspect or design described as "preferred" in the specification is not necessarily be construed as advantageous over other aspects or designs. Rather, the word "preferred" is used to put forward a concept in a specific manner. For example, the term "or" used in this application is intended to mean an inclusive "or" rather than an exclusive "or". That is, unless specified otherwise or clear from the context, "X uses A or B" refers to any of natural inclusive permutations. That is, if X uses A, X uses B, or X uses both A and B, "X uses A or B" is satisfied in any one of the foregoing examples.

Moreover, although the present disclosure is shown and described by using one or more implementation manners, persons skilled in the art may conceive of equivalent variations and modifications based on reading and understanding of the specification and the accompany drawings. The present disclosure includes all such variations and modifications, which is only limited by the scope of the appended claims. In particular regard to the various functions performed by the foregoing components (such as elements and resources), terms used to describe such components are intended to correspond to any component (unless indicated otherwise) performing specified functions of the components (for example, the components are equivalent in functions), even though structures of the functions are not equivalent to the disclosed structures of functions in the exemplary implementation manners in the specification shown in the specification. In addition, although specific features of the specification are disclosed with respect to only one of several implementation manners, the features may be combined with one or more other features of other implementation manners that are desirable for and advantageous to a given or specific application. Moreover, for the terms "include", "have", "contain" or variations thereof being used in specific implementation manners or claims, the terms are intended to be inclusive in a similar manner to that of the term "comprise".

The functional modules in the embodiments of the present disclosure may be integrated into one processing module, or each of the modules may exist alone physically, or two or more modules may be integrated into one module. The integrated module may be implemented in the form of hardware, or may be implemented in the form of a software functional module. When the integrated modules are implemented in a form of a software functional module and sold or used as an independent product, the modules may be stored in a computer-readable storage medium. The storage medium may be a read-only memory, a magnetic disk, an optical disc, or the like. The foregoing apparatuses or system may perform the method in the corresponding method embodiment.

To sum up, the present disclosure has been disclosed through embodiments; however, the embodiments are not intended to limit the present disclosure, and a person of ordinary skill in the art can make various modifications and improvements without departing from the spirit and scope of the present disclosure; therefore, the protection scope of the present disclosure should be subject to the scope defined by the claims.

What is claimed is:

1. An event information push method performed at a computer system having one or more processors and memory storing one or more programs to be executed by the one or more processors, the method comprising:
   collecting network messages associated with a first news event from a plurality of user accounts of a social networking platform, wherein a first user account has access to the network messages on the social networking platform that include (1) chat messages exchanged within a one-to-one chat with the first user account and a group chat in which the first user account participates and (2) post messages published by one or more direct contacts of the first user account on the social networking platform;
   performing aggregation on the network messages, to obtain a piece of event information corresponding to a synopsis of the first news event based on the collected network messages, the aggregation including:
      clustering, using a first machine learning classification model, the collected network messages into one or more categories of network messages associated with the first news event according to correlation degrees of the network messages, wherein a correlation degree between two network messages is dependent on content, a closeness in publish time, and user relevance of the two messages, and
      combining each category of network messages obtained through the clustering process into the piece of event information, wherein the combined piece of event information comprises content from network messages related to (1) a time sequence of occurrence of content related to the first news event, (2) other news events sharing the same event keywords with the first news event, (3) preventive content associated with the first news event, and (4) blessing posts associated with the first news event;
   obtaining, for the piece of event information, one or more attributes from the corresponding category of network messages, the one or more attributes of the event information comprising event content, a propagation path, and associated user information;
   obtaining, from the piece of event information and user database, a user group corresponding to the one or more attributes of the piece of event information, the piece of event information and the user database comprising multiple event information categories, multiple user groups, and a correspondence between the event information categories and the user groups;
   receiving a request from a mobile device associated with a first user account in the user group of the social networking platform to push event information associated with the first news event to the first user account;
   selecting network messages associated with the first news event, the selected network messages including chat messages and post messages which the first user account has access to; and
   pushing the piece of event information and the selected associated network messages including the chat messages and the post messages to which the first user account have access to the user device.

2. The event information push method according to claim 1, further comprising:
   obtaining an event information browse record of a user of the social networking platform; and
   establishing the event information and user database according to the one or more attributes of each piece of event information in the event information browse record and one or more attributes of the user.

3. The event information push method according to claim 2, wherein the operation of establishing the event information and user database according to the one or more attributes of each piece of event information in the event information browse record and one or more attributes of the user comprises:
   classifying the event information by using the attributes of the event information as a feature and by using a second machine learning classification model, to obtain event information categories;
   determining the multiple user groups according to the category of the event information and the one or more attributes of the corresponding user; and
   establishing the event information and user database by using the category of the event information and the multiple user groups.

4. The event information push method according to claim 1, wherein the operation of collecting network messages from a social networking platform, and performing aggregation on the network messages, to obtain corresponding event information comprises:
   obtaining features of the network messages from the social networking platform, the features of the network messages comprising description content, a message form, and a related link; and
   performing aggregation on the network messages according to the features of the network messages, to obtain the corresponding event information.

5. The event information push method according to claim 1, wherein the operation of pushing each piece of event information to a user in the user group corresponding to the event information further comprises:
   obtaining at least one piece of similar event information whose similarity to the event information is greater than a first set value, the similar event information and the event information belonging to a same event information category in the event information and user database; and
   pushing the similar event information to the user in the user group.

6. The event information push method according to claim 1, wherein the operation of pushing each piece of event information to a user in the user group corresponding to the event information further comprises:
   obtaining at least one piece of subsequent event information of the event information, the subsequent event information and the event information having same event keywords, and a release time of the subsequent event information being later than a release time of the event information; and
   pushing the subsequent event information to the user in the user group.

7. The event information push method according to claim 1, wherein the operation of pushing each piece of event information to a user in the user group corresponding to the event information further comprises:
   obtaining at least one piece of related event information of the event information, the related event information being event information whose user browse frequency is greater than a second set value after the user browses the event information; and
   pushing the related event information to the user in the user group.

8. The event information push method according to claim 1, wherein the operation of pushing each piece of event information to a user in the user group corresponding to the event information further comprises:
   obtaining network messages associated with the event information that have been shared with the user using the social networking platform; and
   pushing a sequence of network messages including the obtained network messages to the user in the user group, wherein the sequence of network messages includes at least one network message that is not associated with the event information.

9. The event information push method according to claim 8, wherein the sequence of network messages is presented to the user in a chat room format supported by social networking platform.

10. The event information push method according to claim 1, wherein the piece of event information pushed to a user in the user group includes no network message that has not been shared with the user in the user group previously.

11. A computer system comprising:
   one or more processors;
   memory; and
   one or more programs stored in the memory that, when executed by the one or more processors, cause the computer system to perform a plurality of operations including:
      collecting network messages associated with a first news event from a plurality of user accounts of a social networking platform, wherein a first user account has access to the network messages on the social networking platform that include (1) chat messages exchanged within a one-to-one chat with the first user account and a group chat in which the first user account participates and (2) post messages published by one or more direct contacts of the first user account on the social networking platform;
      performing aggregation on the network messages, to obtain a piece of event information corresponding to a synopsis of the first news event based on the collected network messages, the aggregation including:
         clustering, using a machine learning classification model, the collected network messages into one or more categories of network messages associated with the first news event according to correlation degrees of the network messages, wherein a correlation degree between two network messages is dependent on content, a closeness in publish time, and user relevance of the two messages, and
         combining each category of network messages obtained through the clustering process into the piece of event information, wherein the combined piece of event information comprises content from network messages related to (1) a time sequence of occurrence of content related to the first news event, (2) other news events sharing the same event keywords with the first news event, (3) preventive content associated with the first news event, and (4) blessing posts associated with the first news event;
      obtaining, for the piece of event information, one or more attributes from the corresponding category of network messages, the one or more attributes of the event information comprising event content, a propagation path, and associated user information;
      obtaining, from the piece of event information and user database, a user group corresponding to the one or more attributes of the piece of event information, the piece of event information and the user database comprising multiple event information categories, multiple user groups, and a correspondence between the event information categories and the user groups;
      receiving a request from a mobile device associated with a first user account in the user group of the social networking platform to push event information associated with the first news event to the first user account;
      selecting network messages associated with the first news event, the selected network messages including chat messages and post messages which the first user account have access to; and
      pushing the piece of event information and the selected associated network messages including the chat messages and the post messages to which the first user account have access to the user device.

12. The computer system according to claim 11, wherein the plurality of operations further include:
   obtaining an event information browse record of a user of the social networking platform; and
   establishing the event information and user database according to the one or more attributes of each piece of event information in the event information browse record and one or more attributes of the user.

13. The computer system according to claim 11, wherein the operation of collecting network messages from a social networking platform, and performing aggregation on the network messages, to obtain corresponding event information comprises:
   obtaining features of the network messages from the social networking platform, the features of the network messages comprising description content, a message form, and a related link; and
   performing aggregation on the network messages according to the features of the network messages, to obtain the corresponding event information.

14. The computer system according to claim 11, wherein the operation of pushing each piece of event information to a user in the user group corresponding to the event information further comprises:
   obtaining at least one piece of similar event information whose similarity to the event information is greater than a first set value, the similar event information and the event information belonging to a same event information category in the event information and user database; and
   pushing the similar event information to the user in the user group.

15. The computer system according to claim 11, wherein the operation of pushing each piece of event information to a user in the user group corresponding to the event information further comprises:
   obtaining at least one piece of subsequent event information of the event information, the subsequent event information and the event information having same event keywords, and a release time of the subsequent event information being later than a release time of the event information; and
   pushing the subsequent event information to the user in the user group.

16. The computer system according to claim 11, wherein the operation of pushing each piece of event information to a user in the user group corresponding to the event information further comprises:
   obtaining at least one piece of related event information of the event information, the related event information being event information whose user browse frequency is greater than a second set value after the user browses the event information; and pushing the related event information to the user in the user group.

17. The computer system according to claim 11, wherein the operation of pushing each piece of event information to a user in the user group corresponding to the event information further comprises:

obtaining network messages associated with the event information that have been shared with the user using the social networking platform; and pushing a sequence of network messages including the obtained network messages to the user in the user group, wherein the sequence of network messages includes at least one network message that is not associated with the event information.

18. The computer system according to claim 11, wherein the piece of event information pushed to a user in the user group includes no network message that has not been shared with the user in the user group previously.

19. A non-transitory computer readable storage medium storing one or more programs, wherein the one or more programs, when executed by one or more processors of a computer system, cause the computer system to perform a plurality of operations including:

collecting network messages associated with a first news event from a plurality of user accounts of a social networking platform, wherein a first user account has access to the network messages on the social networking platform that include (1) chat messages exchanged within a one-to-one chat with the first user account and a group chat in which the first user account participates and (2) post messages published by one or more direct contacts of the first user account on the social networking platform;

performing aggregation on the network messages, to obtain a piece of event information corresponding to a synopsis of the first news event based on the collected network messages, the aggregation including:

clustering, using a machine learning classification model, the collected network messages into one or more categories of network messages associated with the first news event according to correlation degrees of the network messages, wherein a correlation degree between two network messages is dependent on content, a closeness in publish time, and user relevance of the two messages, and combining each category of network messages obtained through the clustering process into the piece of event information, wherein the combined piece of event information comprises content from network messages related to (1) a time sequence of occurrence of content related to the first news event, (2) other news events sharing the same event keywords with the first news event, (3) preventive content associated with the first news event, and (4) blessing posts associated with the first news event;

obtaining, for the piece of event information, one or more attributes from the corresponding category of network messages, the one or more attributes of the event information comprising event content, a propagation path, and associated user information;

obtaining, from the piece of event information and user database, a user group corresponding to the one or more attributes of the piece of event information, the piece of event information and the user database comprising multiple event information categories, multiple user groups, and a correspondence between the event information categories and the user groups;

receiving a request from a mobile device associated with a first user account in the user group of the social networking platform to push event information associated with the first news event to the first user account;

selecting network messages associated with the first news event, the selected network messages including chat messages and post messages which the first user account have access to; and pushing the piece of event information and the selected associated network messages including the chat messages and the post messages to which the first user account have access to the user device.

20. The non-transitory computer readable storage medium according to claim 19, wherein the plurality of operations further include:

obtaining an event information browse record of a user of the social networking platform; and establishing the event information and user database according to the one or more attributes of each piece of event information in the event information browse record and one or more attributes of the user.

* * * * *